United States Patent
Bishop et al.

(10) Patent No.: US 12,024,266 B2
(45) Date of Patent: Jul. 2, 2024

(54) SEA HOSE LOAD ANALYZER SYSTEM

(71) Applicant: Dunlop Oil & Marine Ltd., Pyewipe (GB)

(72) Inventors: Simon Bishop, Beverley (GB); Paul Staton, Grimsby (GB)

(73) Assignee: Dunlop Oil & Marine Ltd., Pyewipe (GB)

( * ) Notice: Subject to any disclaimer, the term of this patent is extended or adjusted under 35 U.S.C. 154(b) by 1007 days.

(21) Appl. No.: 16/944,467

(22) Filed: Jul. 31, 2020

(65) Prior Publication Data

US 2022/0034773 A1 Feb. 3, 2022

(51) Int. Cl.
| | |
|---|---|
| *B63B 27/34* | (2006.01) |
| *B63B 22/02* | (2006.01) |
| *B63B 79/10* | (2020.01) |
| *B67D 9/00* | (2010.01) |
| *F16L 11/133* | (2006.01) |
| *G01L 5/16* | (2020.01) |

(52) U.S. Cl.
CPC ............ *B63B 27/34* (2013.01); *B63B 22/021* (2013.01); *B63B 79/10* (2020.01); *B67D 9/00* (2013.01); *F16L 11/133* (2013.01); *G01L 5/16* (2013.01); *F16L 2201/30* (2013.01)

(58) Field of Classification Search
CPC ......... B63B 27/00; B63B 27/34; B63B 79/00; B63B 79/10; B63B 22/00; B63B 22/021; B67D 9/00; F16L 11/133; G01L 5/16
USPC .......................................................... 441/4
See application file for complete search history.

(56) References Cited

U.S. PATENT DOCUMENTS

| | | | | |
|---|---|---|---|---|
| 6,834,556 B2* | 12/2004 | Cain | ...................... | G01M 3/002 |
| | | | | 73/861.24 |
| 9,353,594 B2 | 5/2016 | Arya | | |
| 11,565,932 B2* | 1/2023 | Bishop | .................... | B63B 27/34 |
| 2003/0079553 A1 | 5/2003 | Cain et al. | | |
| 2015/0096759 A1 | 4/2015 | Gilmore | | |
| 2020/0156926 A1 | 5/2020 | Bishop et al. | | |
| 2020/0165888 A1 | 5/2020 | Liezenberg et al. | | |

FOREIGN PATENT DOCUMENTS

EP 1832798 A1 9/2007

OTHER PUBLICATIONS

International Search Report dated Nov. 3, 2021 of PCT/EP2021/071060 claiming priority this application.

* cited by examiner

*Primary Examiner* — Lars A Olson
(74) *Attorney, Agent, or Firm* — Gregory J. Adams; Richard A. Wolf

(57) ABSTRACT

A sea hose load analyzer system is disclosed. The sea hose load analyzer system also includes a transceiver interface. The sea hose load analyzer system also includes a memory storage. The sea hose load analyzer system also includes circuitry may include one or more processors configured to: receive load information of one or more sea hoses as node unit data via the transceiver interface, store the load information in the memory storage, and monitor additional node unit data via the transceiver interface.

16 Claims, 8 Drawing Sheets

SEA HOSE LOAD ANALYZER SYSTEM

FIELD

The field to which the disclosure generally relates floating and subsea hoses used to transport liquids.

BACKGROUND

Subsea and floating hose transport systems are often used in conjunction with an oil platform or an oil rig. In this process, the produced oil is first conveyed from a tanker to the drilling platform via an underwater hose to the buoy. As soon as the capacity of the tanker is depleted, the floating hose is detached from the tanker again so that the tanker can continue on. The floating buoy together with the floating hose remains on the sea. However, it can take several hours or even several days before a new tanker is connected to the floating hose. This is especially true in very rough seas.

The hoses are subjected to a variety of loads and/or effects during operation. These loads can cause problems, such as interrupted fluid transfer or degraded operation.

What is needed are techniques to facilitate fluid and/or air transfer in subsea and floating hoses.

DETAILED DESCRIPTION

Figure 1:
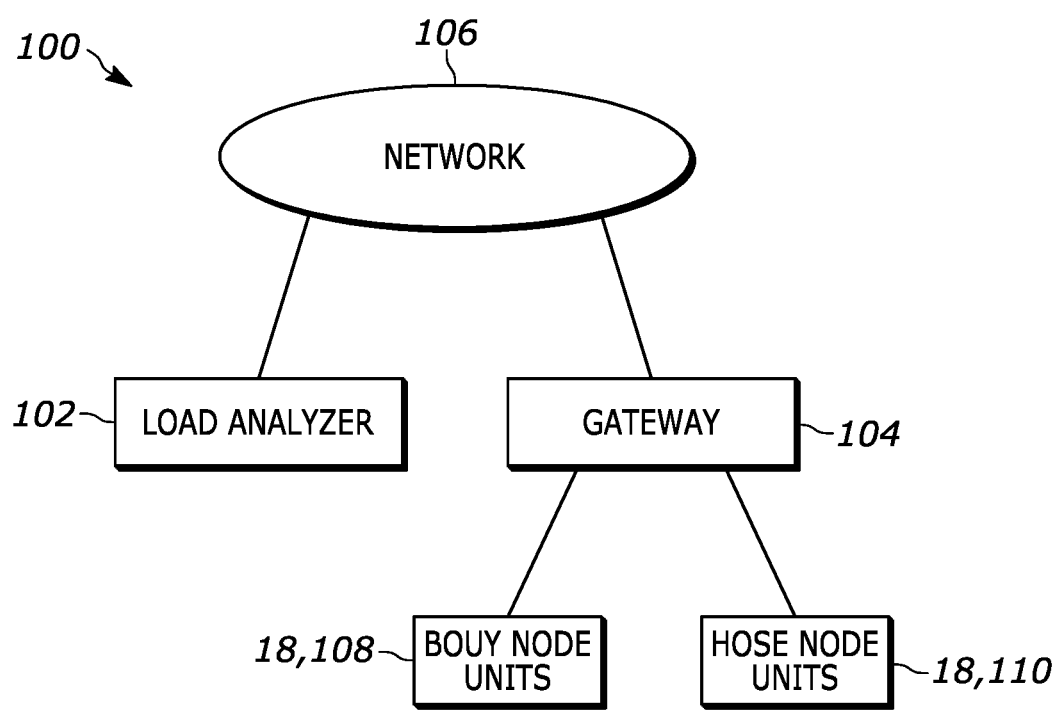
FIG. 1 is a diagram illustrating a sea hose load analyzer system 100 in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Oil transport systems have a buoy, a floating hose and a subsea hose. The floating hose is also buoyant. Such systems are often used in conjunction with an oil platform or an oil rig. In this process, the produced oil is first conveyed from the drilling platform via an underwater hose to the buoy and from there via the floating hose to a tanker. The tanker can take the oil. As soon as the capacity of the tanker is reached, the floating hose is detached from the tanker again so that the tanker can call at a port. The floating buoy together with the floating hose remains on the sea.

The hoses are subjected to a variety of loads and/or effect during operation, such as axial strain, compressive strain, bending strain, torsional strain, water temperature and the like. These loads can degrade the hoses over time and may require repair or replacement.

One or more embodiments are disclosed that include sensors that measure strain and the like over time. The data from these sensors is used to predict hose lifetime, identify hose degradation, determine repair and the like.

By monitoring the loads seen by the individual hoses at different points along the hose string, and collecting that data, a real life load profile can be built up on a timeline to be able to find the load level seen by the hose. This can then be compared against the design loads and current condition/operation of the hose.

In addition, this continual monitoring can be utilized to generate a fatigue model of each individual hose to allow the operator to change out different hoses according to their actually loads seen and fatigue seen. This in turn to allow for a safer and more efficient system Wireless nodes are located on each of the hoses and are linked to load sensors within the hose provide a snapshot load data of each node on a regular basis. This resulting load information is then transmitted through satellite/cellular/communication (or other) back to shore.

Through use of the above infrastructure system, and load sensors within the hoses we can gain an accurate load profile of the individual hoses over their lifetime.

The system can be programmed to assess the data received on the individual nodes against a pre-defined operational loading envelope. If the hose is within the defined operational window, then no action and data just recorded. If the load is found to be outside of the operational loading values, an alert can be sent to the operator.

Battery powered sensor 'nodes' referred to as node units are attached to floating buoy systems, measuring loads experienced by the hoses themselves—communicating these values wirelessly with a central 'hub' to process the data and compress to allow for wireless satellite transmission of data into cloud.

Algorithms then assessing the measured load data from the hoses against the predefined operational load window for the hoses/floating hose system, then providing alerts for the operator should the hose be measured to be outside of the safe working loading values.

There is potential to monitor from individual hoses, although option for retrofit load monitoring spool piece also developed as an option Additionally, local sea state/weather data would help improve accuracy Further features, advantages and possible applications of the present invention result from the following description of the design examples and the figures. All described and/or pictorially represented features, on their own and in any combination, constitute the subject-matter of the invention, also independently of their composition in the individual claims or their withdrawals. The same reference signs for the same or similar objects continue to appear in the figures.

FIG. 1 is a diagram illustrating a sea hose load analyzer system 100 in accordance with one or more embodiments. The system 100 is provided for illustrative purposes and it is appreciated that suitable variations are contemplated.

The system 100 can be used with fluid transfer systems, such as single point mooring (SPM) and multiple point mooring (MPM) systems. Some examples of SPM include turret buoys, single anchor leg mooring (SALM), single point mooring towers, Spars, articulated platforms, Catenary Anchor Leg Mooring (CALM) and the like to facilitate tankers loading or discharging liquid near onshore storage, production fields and the like.

The SPM CALM system generally includes a tanker mooring securely to a single buoy in open waters offshore. Then, free ends of floating hoses are connected to the buoy are connected to the tanker and liquid is pumped through the hoses, buoy, subsea risers, manifolds, subsea pipeline, storage and the like. The liquid can be transferred from the tanker to storage and/or from the storage to the tanker.

The system 100 includes an analyzer 102, a gateway 104 and node units 18. The node units 18 include buoy node units 108 and sea hose node units 110.

The analyzer 102 is configured to receive node data from node units 18 located on buoys, hoses, platforms and the like.

The node data includes load information based on axial strain, compressive strain, bending, torsional strain and the like. The load information can include hose pressure.

Additionally, the node data can also include positions, movement, temperature, humidity and the like. The node data is received from a network 106 by way of the gateway 104.

The network 106 can be a cloud network, wireless network, cellular network, wired network and/or the like.

The analyzer 102 is configured to determine an operational envelope and/or obtain the operational envelope. The operational envelope includes an operational load envelope, which defines or identifies a range of suitable loading for the sea hoses. The operational load envelope can include pressure ranges over time, axial strain tolerances, compressive strain tolerances, bending tolerances, torsional tolerances and the like.

The analyzer 102 can determine the envelope based on a set of data obtained over a time period, such as a number of days. For example, the analyzer 102 could use the movement/locations over the number of days to identify ranges of locations/positions for the buoy or hoses.

Additionally, the analyzer 102 can determine the envelope data based on hose materials used and the like.

In one example, the operational position envelope is a geometric shape, such as an ellipse, about a surface of the ocean/water.

The analyzer 102 is configured to record data, compare node positions, node movement, temperature, humidity, thresholds and the like.

The analyzer 102 can also be configured to analyze the node data and develop correlations, such as correlations with moon, season and the like. Further, the analyzer 102 can be configured to develop maintenance schedules.

Further, the analyzer 102 can be configured to trigger alarms based on comparisons of the node data with one or more thresholds.

For example, the analyzer 102 can trigger an alarm and/or notification upon node unit data including a position outside of the operational position envelope. Such a position could indicate damage and/or failure being present in the system.

The analyzer 102 is configured to develop and maintain one or more models of floating hose behavior.

The gateway 104 is configured to transmit the node data from node units 18 to the network 106 for reception by the analyzer 102. The gateway 104 is configured to generate transmissions with the data in accordance with one or more compatible protocols and one or more compatible communication channels.

The gateway 104 can be located on a platform, tanker, buoy and the like.

The buoy node units 108 are located on one or more buoys. The units 108 measure and/or generate position information, temperature, humidity and the like. It is appreciated that the node units 108 can communicate with each other, for example, by radio signals. Thus, an individual node unit can pass information from other node units to the gateway 104 and/or the network 106.

The hose node units 110 are located on floating and/or subsea hose segments and/or strings.

In one example, the system 100 is used with a fluid transfer system that includes, proceeding from the tanker manifold to the onshore storage: floating hoses (making up a hose strings), a product swivel housed inside the buoy that provides a fluid transfer path between the geostatic part and the rotating part of the buoy, subsea hose risers between the buoy and a pipeline end manifold (PLEM) or pipeline end termination (PLET), PLEM housing the various valves and Subsea pipeline/s between the PLEM and onshore storage.

Floating hoses transfer the fluid product between the tanker manifold to the SPM. They are permanently connected to the buoy at one end. The loose end is picked up by a tanker tanker crane/derrick and connected to the tanker's midship manifold during operation. The loose ends are not tied back to the buoy between operations, but floats freely.

Each hose string consists of a plurality of individual hoses (typically 9 m to 12 m in length) flanged together to make up a string of suitable length for operations, taking into consideration the buoy design, ocean conditions and size of tankers visiting the SPM. String lengths are typically from 150 m to 250 m but they can be made up to any suitable required length. Typically, a SPM will have connections available for 2 floating hose strings, but can be less or more.

During operation, the hose strings float and stream in a specific bight, as seen next to the tanker and an incorrect length hose string will have undesirable consequences.

The hose strings are generally sound against leakages, flexible, positively buoyant and operable for harsh open sea conditions.

Liquid handling through the buoy involves piping similar that includes, elbows, spools, expansion joints, floating flanges, valves, and the like.

Subsea hose risers form the link between the underside of the buoy and the PLEM. They are installed in a few basic configurations, designed to accommodate tidal depth variation and lateral displacement due to mooring loads. The hose curvature changes to accommodate lateral and vertical movement of the buoy—within an acceptable footprint—while the hoses are supported at near neutral buoyancy by floats along its length.

Some suitable subsea hose string arrangements are Chinese lantern, Lazy-S, Midwater Arch, Steep-S and the like. The Chinese Lantern includes two to four mirror symmetrical hoses connect the PLEM with the buoy, with the convexity of the curve facing radially outwards—giving the outlined shape of a traditional chinese lantern. The Lazy-S arrangement includes where a riser hose leaves the PLEM at a steep angle, then flattens out before gradually curving upwards to meet the buoy approximately vertically, in a shape that looks like a flattened S-surve. The Midwater Arch arrangement includes a steel arch with buoyancy that is suspended from a seabed and tied back to a gravity anchor, and the hose is run over the arch, down into a bight and up to the buoy again. The Steep-S arrangement is where the hose or string first rises roughly vertically to a submerged float, before making a sharp bend downwards followed by a slow curve through horizontal to a vertical attachment to the buoy. It is appreciated that other suitable hose arrangements are contemplated.

Figure 2:
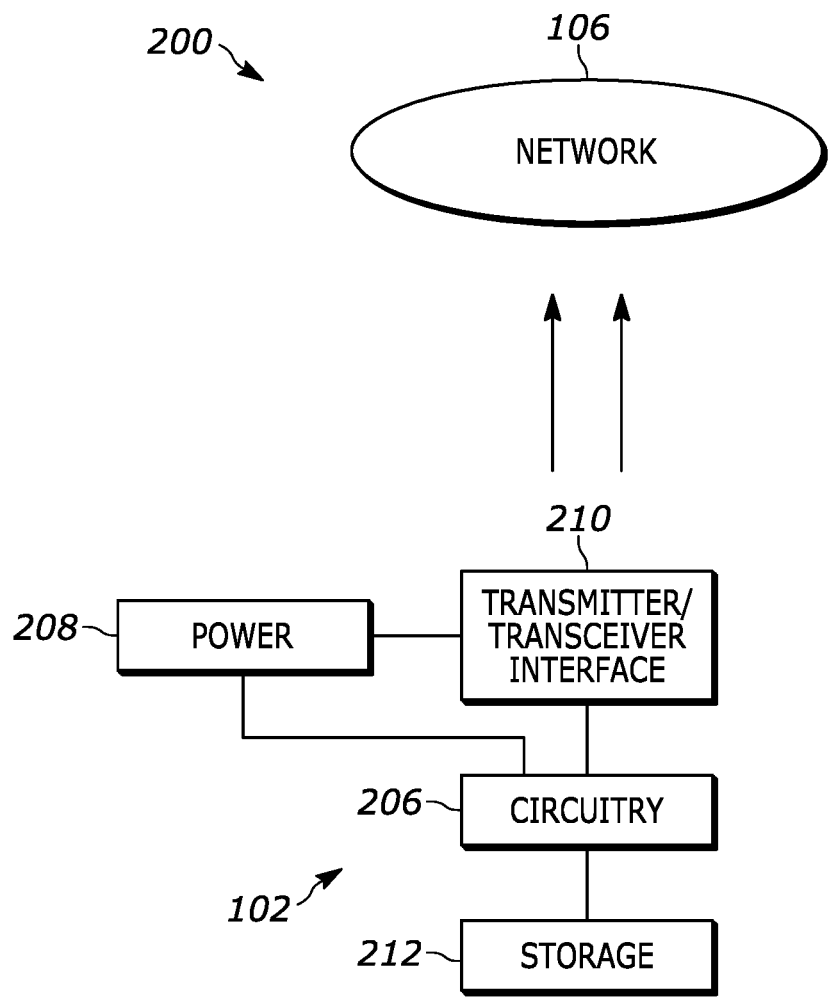
FIG. 2 is a diagram illustrating the analyzer 102 in accordance with one or more embodiments.

FIG. 2 is a diagram illustrating the analyzer 102 in accordance with one or more embodiments. The analyzer 102 is provided for illustrative purposes and it is appreciated that suitable variations are contemplated.

The analyzer 102 includes a power supply 208, a transceiver interface 210 and circuitry 206.

The power supply 208 is configured to provide suitable power for the transceiver 210 and the circuitry 206. In one example, the power supply 208 is battery power. In another example, the power supply 208 is a constant power or mains power.

The transceiver interface 210 is connected to a transceiver (not shown) and provides data/information for transmission to the network 106 and receives data/information from the network 106.

The circuitry 206 can includes suitable circuits, integrated circuits, one or more processors, memory devices, logic, registers and the like. The circuitry 206 can perform the functionality of the analyzer 102.

The circuitry 206 is configured to determine an operational envelope as described above for the analyzer 102.

Figure 3:
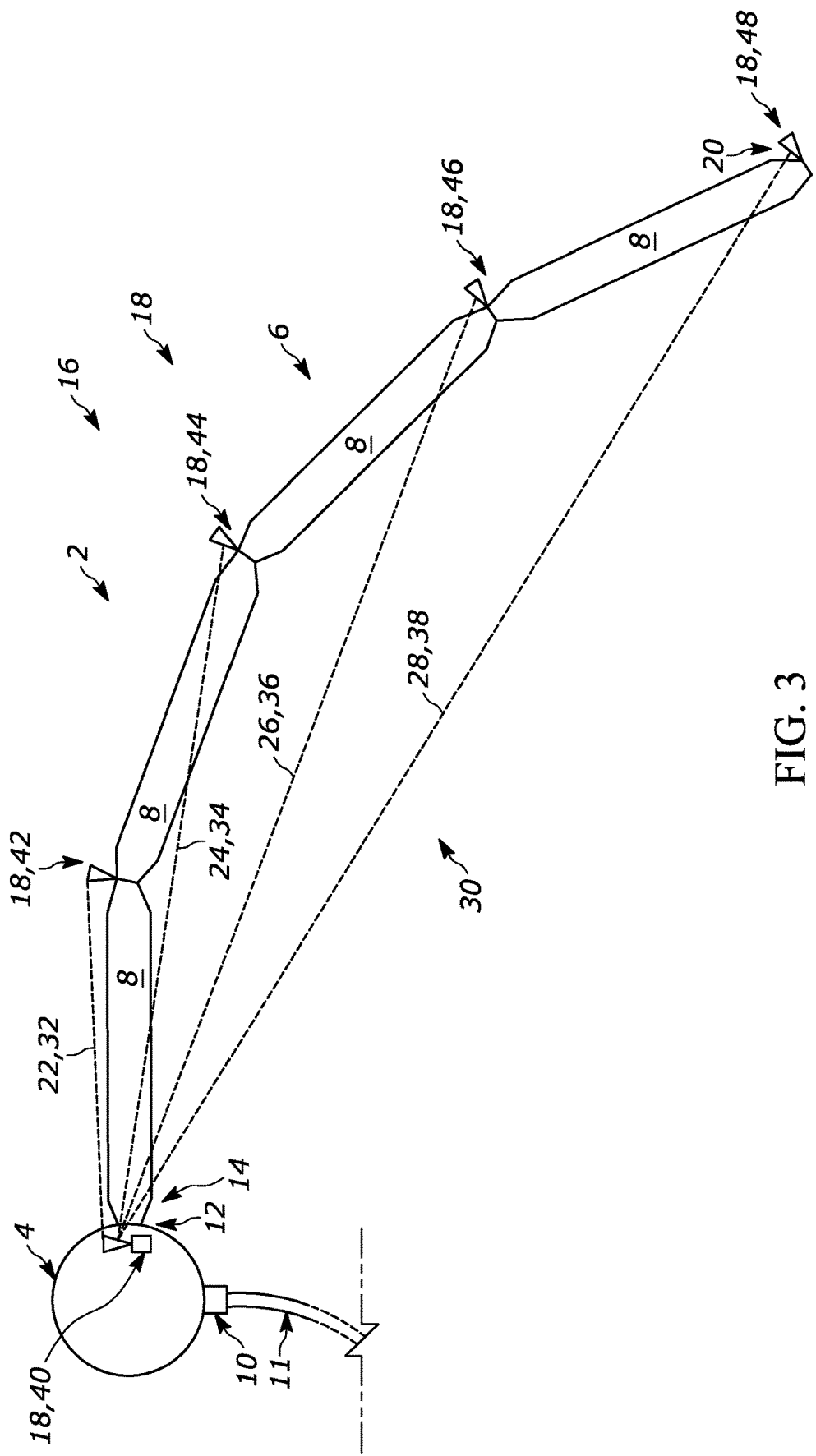
FIG. 3 shows system 2 with a buoy 4 and a buoyant floating hose 6. The floating hose 6 is formed by a number of floating hose segments 8.

FIG. 3 shows system 2 with a buoy 4 and a buoyant floating hose 6. The floating hose 6 is formed by a number of floating hose segments 8. The hose segments 8 are connected to each other in a row one behind the other in such a way that the floating hose 6 is formed by the hose segments 8 with a continuous, common fluid channel extending from a first end 14 of the hose 6 to a second end 20 of the hose 6. With the first end 14 the floating hose 6 is coupled to a liquid outlet connection 12 of the buoy 4 in such a way that liquid can flow from the liquid outlet connection 12 into the liquid channel of the floating hose 6.

System 2 is used to swim on the sea. System 2 is therefore a buoyant system. It can swim on water. The same applies to each hose segment 8 or to the floating hose 6 as well as to the buoy 4. The buoy 4 can be connected to an underwater hose 11 by means of a fluid inlet connection 10, which is only shown in sections and schematically in FIG. 3. Via the underwater hose 11, liquid, in particular oil, can be conveyed from a drilling platform to the buoy or the associated liquid input connection 10. The liquid inlet port 10 is connected directly or switchably to the liquid outlet port 12. Oil that flows through the underwater hose to the liquid inlet connection 10 of the buoy 4 can then be pumped through the liquid outlet connection 12 and the floating hose 6 coupled to it. The second end 20 of the floating hose 6 can be coupled to a floating tanker (i.e. a ship designed as a tanker) into which the oil can flow. However, the floating tanker is not permanently coupled to the second end 20 of the floating hose 6. As soon as the tanks of the floating tanker are full, the second end 20 of the floating hose 6 is decoupled from the floating tanker so that the floating tanker can call at a port. In the time the swimming hose 6 with the free, second end 20 floats on the sea. In stormy weather and a correspondingly high swell, the floating hose 6 may overlap in a loop. Reconnecting the floating tanker to the second end of the floating hose is then difficult, if not impossible. In order to be informed before the arrival of the floating tanker whether the floating hose 6 can be connected to the floating tanker without any problems, it is intended that the system 2 has a plurality of node units 18.

The plurality of node units 18 are attached to the floating hose 6 and the buoy 4 and include that the node units 18 are distributed between the buoy 4 and the second end 20 of the floating hose 6. For example, it may be provided that a node unit 18, designated as main unit 40, is attached to buoy 4. Another node unit 18 may be designated as first node unit 42, which is attached to the end of the first hose segment 8 facing away from buoy 4. The same can apply to each of the other hose segments 8. Thus, a second node unit 44 can be provided for the second hose segment 8, a third node unit 46 for the third hose segment 8 and a fourth node unit 48 for the fourth hose segment 8. The junction units 42, 44, 46, 48 assigned to the hose segments 8 can be firmly attached to the respective hose segment 8.

Each of the node units 18 is designed by means of an associated radio unit to establish a radio link 22, 24, 26, 28 to each of at least two of the other radio units of the respective node units 42, 44, 46, 48, so that a radio network 30, in particular a mesh radio network, is formed therefrom. An example of this is shown in FIG. 1 using node unit 18, referred to as Main Unit 40. The radio unit of the main unit 40 can establish a first radio connection 22 to the radio unit of the first node unit 42. The same applies to the second radio link 24 to the second node unit 44, the third radio link 26 to the third node unit 46 and the fourth radio link 28 to the fourth node unit 48. Signals, in particular reference signals, can be exchanged via radio links 22, 24, 26, 28. Based on the exchanged signals, the relative distances between the node units 18 can be determined. It is thus provided that each node unit 18, 40, 42, 44, 46, 48 is designed to determine a relative distance 32, 34, 36, 38 to each further node unit 42, 44, 46, 48 connected via a radio link 22, 24, 26, 28 based on the respective radio link 22, 24, 26, 28. This will be explained purely by way of example using the radio links 22, 24, 26, 28, which are shown in FIG. 3.

For example, the first radio link 22 between the Main Unit 40 and the first Node Unit 42 can be used to determine the first relative distance between the Main Unit 40 and the first Node Unit 42. The same can be provided for the second radio link 24, the third radio link 26 and the fourth radio link 28, so that the corresponding relative distance, namely the second relative distance 34, the third relative distance 36 and the fourth relative distance 38, can be determined from these. Since each of the node units 18 can establish corresponding radio links via the associated radio units, this results in a large number of radio links that allow the corresponding distances to be determined, which are then referred to as relative distances. These relative distances are suitable for determining the geometric arrangement 16 of the floating tube 6 relative to buoy 4. It is therefore intended that at least one of the node units 18 is designed as the main unit 40. In FIG. 1, this is exemplified by the node unit 18, which is attached to buoy 4. This main unit 40 is also designed to collect the relative distances determined by the other node units 42, 44, 46, 48 via radio links 22, 24, 26, 28 and/or radio network 30. In addition, based on the collected relative distances 32, 34, 36, 38, the main unit 40 is designed to determine location data representing the geometric arrangement 16 of the floating hose 6 relative to buoy 4. With these location data it is therefore possible to make a statement as to whether the floating hose 6 has, for example, a loop or another shape which prevents a floating tanker from being able to couple easily and reliably to the second end 20 of the floating hose 6, or whether the arrangement 16 of the floating hose 6 allows the floating tanker to be coupled easily and reliably to the second end 20. It is therefore envisaged that the Main Unit 40 will include a Radio Transmitter Unit 50, which is designed to wirelessly transmit a location signal representing the location data. In this context, reference is made to FIG. 2, in which System 2 is again shown schematically, although the marking of the exemplary radio links and relative distances has been omitted here.

Figure 4:
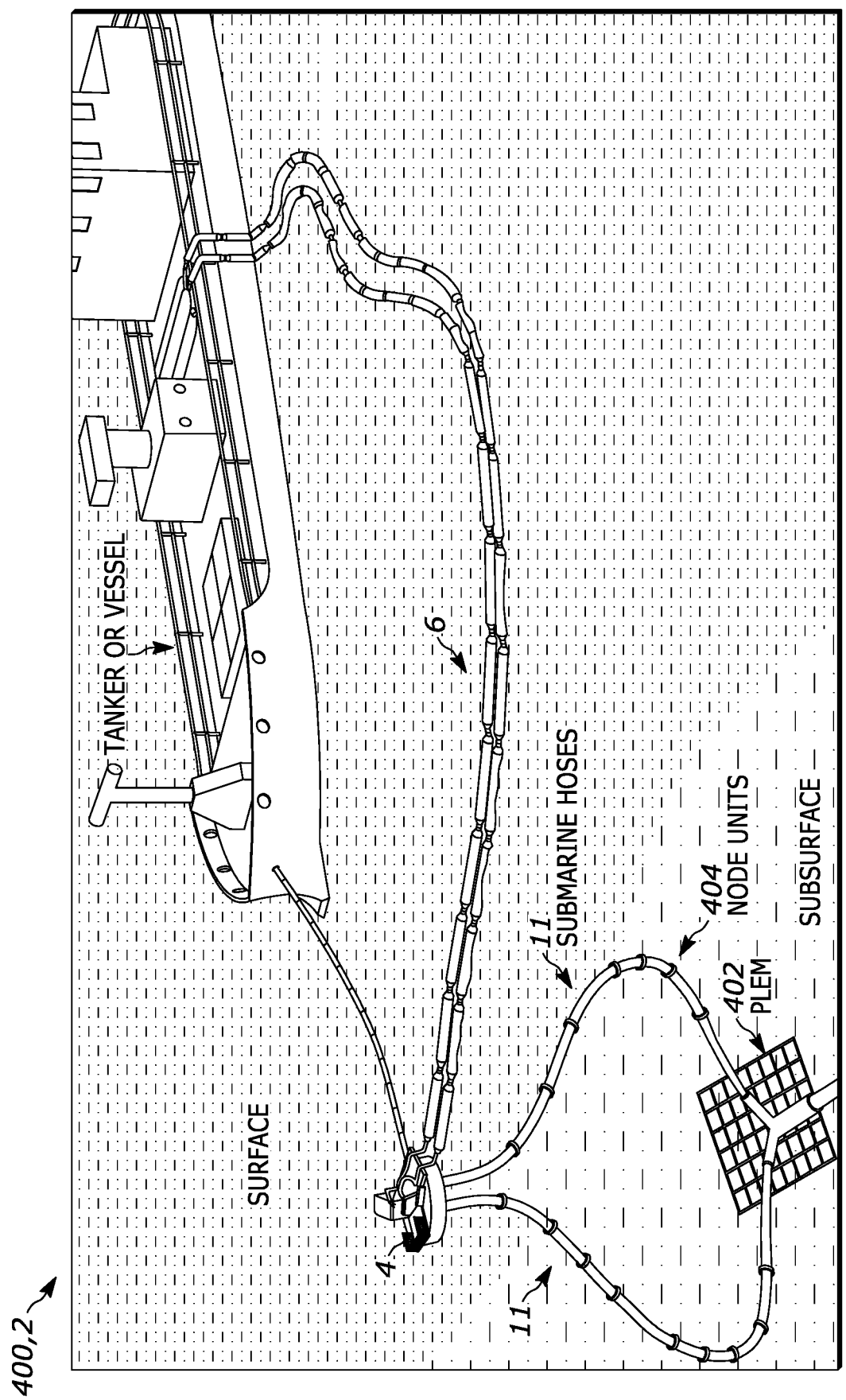
FIG. 4 shows a land-based base station 52, which has a radio receiver 54 designed to receive the location signal transmitted by the radio transmitter unit 50.

FIG. 4 shows a land-based base station 52, which has a radio receiver 54 designed to receive the location signal transmitted by the radio transmitter unit 50. The receiver unit 54 can be coupled with a computing unit 56 of the base station 52, so that the location data represented by the received location signal can be transmitted to the computing unit 56 by the radio receiver 54. The arithmetic unit 56 can be designed to evaluate the location data. In particular, the computing unit 56 can be configured to determine the position of the floating hose 6 relative to buoy 4 based on the location data. It has been explained above that the base station 52 is located on land. However, this is not absolutely necessary. For example, the location signal can be transmitted by means of the radio transmitter unit 50 to a satellite, which in turn transmits the location signal or a signal dependent on it via further signal transmission stations to the radio receiver 54. The radio receiver 54 can also be designed (and also called) a wired receiver if it is directly coupled to a network that can establish a signal connection to a satellite. Alternatively or in addition, the base station 52 can also be installed on a ship, especially on a floating tanker. Then the information about the arrangement of the floating hose 6 is already available on the floating tanker before it arrives at system 2.

The radio units of the node units 18 can be trained to establish radio links 22, 24, 26, 28 over a range of between 1 meter and 1000 meters. On the other hand, the radio transmitter unit 50 is preferably designed to enable the radio transmitter unit to transmit the location signal to a radio receiver 54 located more than 3000 meters away. For example, the radio transmitter unit 50 can be designed to transmit the location signal with a range of at least 10 kilometers.

As can be seen schematically from the overview of 3-5, the hose segments 8 are connected to each other at the front so that they form the floating hose 6, also referred to as a string. Each of the hose segments 8 can have a connecting flange 58 at opposite end sections. Each connecting flange 58 is designed for detachable connection to another connecting flange 58, in particular to another hose segment 8. FIG. 3 shows a schematic diagram of an end section of a hose segment 8. This also shows the connecting flange 58 schematically. The following explanations can be applied analogously to each hose segment 8.

As can be seen schematically from FIG. 3, a junction unit 18 is assigned to the hose segment 8 is arranged and/or fastened to the connecting flange 58. Thus the corresponding node unit 18 can be attached to the connecting flange 58 with a screw connection. For this purpose, the screws can be used which connect the connecting flange 58 with an oppositely arranged connecting flange 58 of another hose segment 8. Each node unit (which can also be referred to as a knot unit) is designed to be 18 watertight. This is of particular advantage when used in the sea, as not only the hose segments 8 but also the node units 18 are or can be exposed to seawater. It is also appreciated that each of the node units 18 can have a source of energy, such as a battery, in particular a rechargeable battery. The capacity of the battery is selected so that the node unit 18 can be operated for a duration, such as at least 18 months, without changing the battery.

In order to better protect the node unit 18 from mechanical shocks and/or from seawater, it may be provided that the node unit 18 assigned to the hose segment 8 is embedded in an outer jacket wall of the respective hose segment 8. The outer part of the jacket wall often has rubber material, in which the respective node unit 18 can be embedded. The advantage of embedding a node unit 18 in the rubber material 62 of a hose segment 8 is that the respective node unit 18 is particularly easily and safely protected against seawater but also against mechanical shocks. However, when embedding the node unit 18 in the rubber material 62, it is preferable that a capacity of the battery of the node unit 18 is such that the node unit 18 can be operated for several years, in particular at least 5 years, without changing the battery.

The jacket wall 60 can be formed by several layers arranged on top of each other in the radial direction. The node unit 18 of a hose segment 8 can therefore also be arranged in a layer further inside the jacket wall, so that even better protection against seawater and/or mechanical shocks can be ensured.

It is also noted that the Main Unit 40 may have a navigation unit designed to receive a navigation signal. In addition, the navigation unit can be designed to determine a location, in this case the location of the buoy 4. Therefore, by means of the navigation unit and the received navigation signal, further information can be added to the location data, which goes beyond the arrangement of the floating hose 6. It is preferred that the Main Unit 40 is configured to supplement the location data in such a way that the location data also represent the geographical buoy location. If this location data is now sent by means of the location signal from the radio transmitter unit 50 of the main unit 40, it can be received, for example, by the floating tanker that is on its way to system 2. Based on the received location signal, it can therefore be evaluated whether the arrangement of the floating hose 6 relative to the buoy 4 is such that a successful coupling of the floating tanker to the second end 20 of the floating hose 6 is possible. In addition, based on the geographical buoy location of buoy 4 and, moreover, the geometric arrangement of the floating hose 6 relative to buoy 4, it can be determined how the floating tanker approaches system 2 in order to effectively prevent a collision with floating hose 6.

It is appreciated that the use of the term radio can include communication using radio frequency (RF), Bluetooth, Bluetooth LE, Bluetooth smart, Long Range (LoRa) low-power wide-area network (LPWAN) technology, ultra wide bandwidth (UWB), Long Term Evolution (LTE), 4G, 5G and the like.

It is also appreciated that the hoses have suitable lengths. Some examples of typical lengths include 30 feet (9.1 meters), 35 feet (10.7 meters), and 40 feet (12.2 meters).

It is appreciated that the relative distances can be utilizes to determine a bend or bentness of the hoses described herein.

Figure 5:
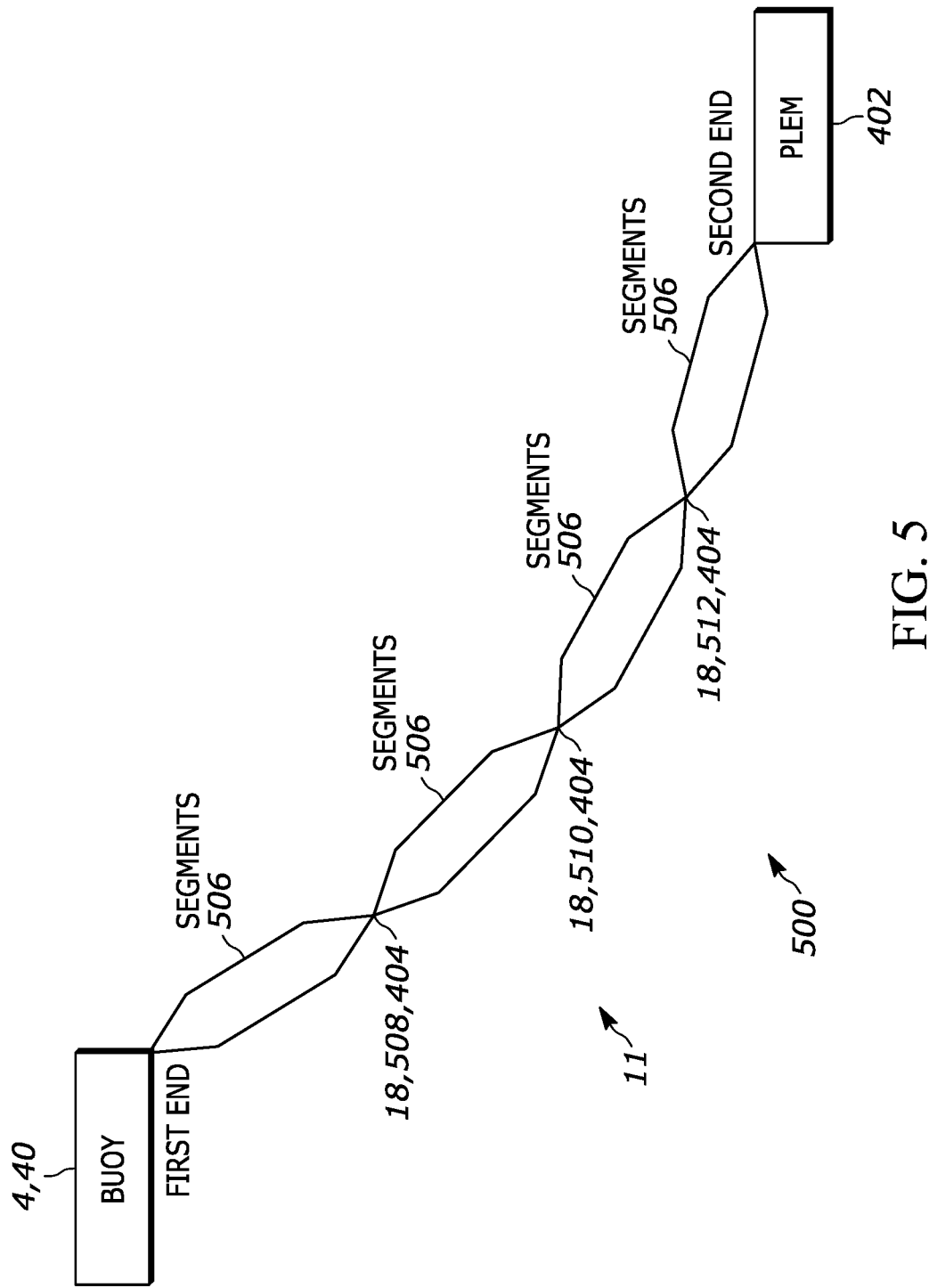
FIG. 5 is a diagram illustrating a fluid transfer system 500 in accordance with one or more embodiments.

FIG. 5 is a diagram illustrating a fluid transfer system 500 in accordance with one or more embodiments. The system 500 includes location sensing for underwater hoses and the like used for fluid transport. The system 500 is provided for illustrative purposes and it is appreciated that suitable variations are contemplated.

The system 500 can also be the system 2, described above. Thus, the description of the system 2 can be referenced for additional description.

Generally, underwater hoses, also referred to as subsea hoses, are subject to damage and/or failure due to weather conditions, mooring lines, and the like. Approaches to identify damaged and/or locate underwater hoses include diving operations. Such operations are expensive, have safety concerns and are not possible during bad weather. Further, these approaches are intermittent.

The system 500 permits continuous monitoring of underwater hoses that includes location information.

The system 500 includes a buoy 4, a buoyant floating hose 6 and one or more underwater hoses 11. The floating hose 6 is connectable to a tanker and the like for sending and/or receiving fluid, such as oil. The floating hose 6 transfers fluid via the buoy 4 from/to the underwater hoses 11.

The buoy 4 includes one or more node units that generate node unit data.

The underwater hoses 11 are configured to transfer fluid between the buoy 4 at a first end and a second end. In this example, a pipeline end manifold (PLEM) or pipeline end termination (PLET) system 502 is connected to the second end of the underwater hoses 11.

The underwater hoses 11 include underwater node units that generate or transmit node unit data.

The node unit data can include, but is not limited to, acoustic signals, radio signals and optical signals to the main unit 40 at the hub. The main unit 40 is configured to determine position information and the like for the underwater hoses 11, hose 6, the buoy 4, and the like based on the node unit data.

The system 500 can remotely monitor relative position of submarine or underwater hoses (passive system) buoy and provide warnings when hose string or buoy is in potentially 'dangerous' position which may lead to damage.

The system 500 can be employed for hose applications where the position of the hose is of interest to the operator— for example dredging, deep sea mining, sea water intake systems and the like.

Further, the system 500, such as circuitry in the node units or elsewhere, can be configured to monitor the relative position of the underwater hoses to identify problematic conditions, described above.

The node units 18 include and/or are connected to a sensor for measuring load on the hoses.

Figure 6:
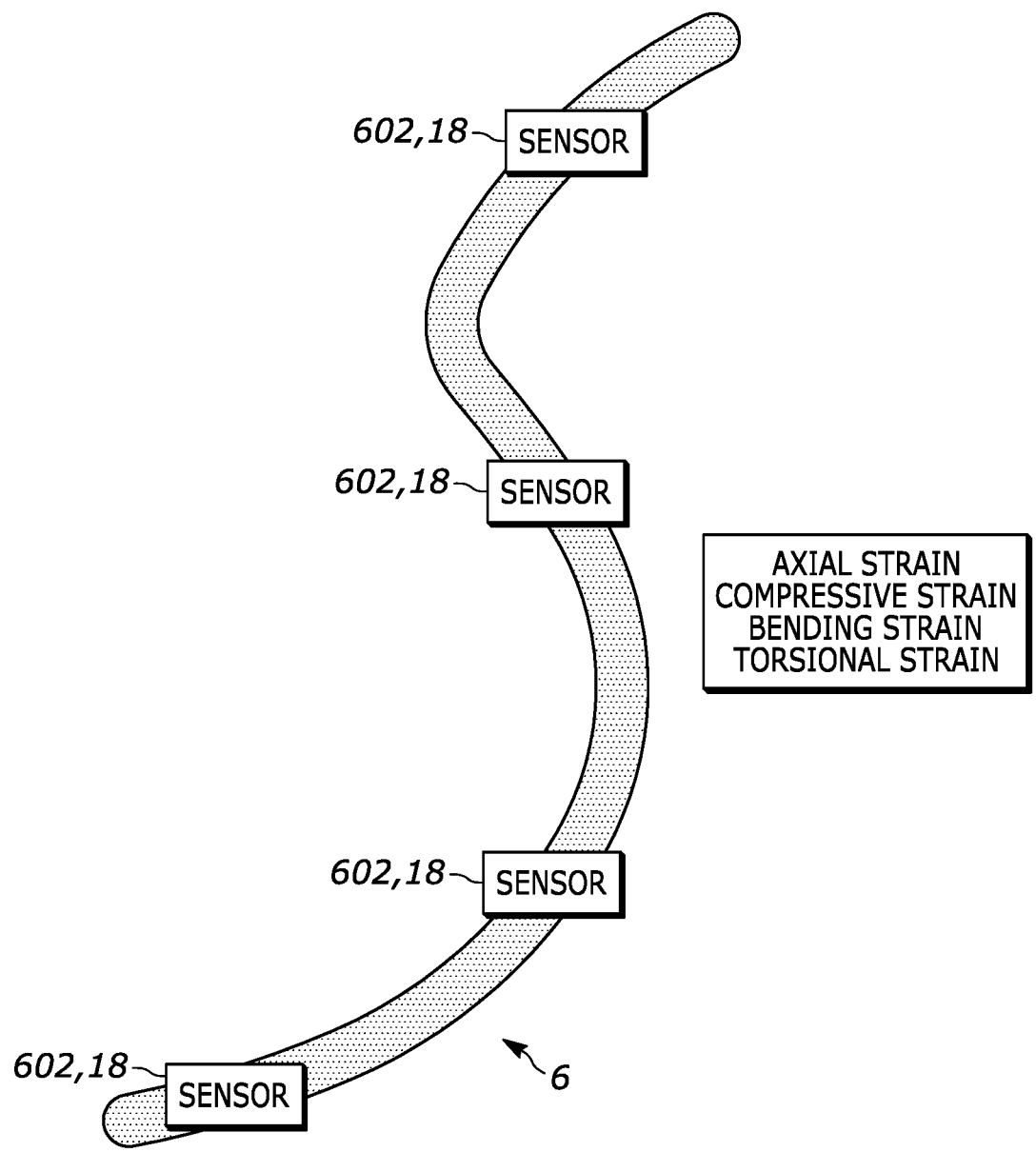
FIG. 6 is a diagram showing an example hose 6 for load sensing in accordance with one or more embodiments.

FIG. 6 is a diagram showing an example hose 6 for load sensing in accordance with one or more embodiments.

The hose 6 is shown as a single hose or string, but can be comprised of a plurality of hoses and/or hose segments.

The node units 18 have integrated load sensors 602 therein. The load sensors 602 are configured to measure one or more of axial strain, compressive strain, bending strain, torsional strain and the like.

The node units 18 can be configured to determine hose pressure and the like based on the measured strain.

The measured strain and/or hose pressure is provided by the node units 18 as node unit data, which can be used by the analyzer 102. Additionally, the measured strain can be provided with hose location information. Thus, for example, strain outside of the operational load envelope can indicate that a repair in a hose is needed and identify or locate where the repair is needed based on the hose location information.

In one example, the load sensor 602 includes a fiber optic material and is embedded in a cord of the hose to sense strain.

In another example, the load sensor 602 is part of a smart rubber and/or is embedded in rubber.

Further, the load sensor 602 can be integrated into the hose 6 during fabrications. Alternately, the load sensors can be attached to the hose 6 at any suitable time after fabrication, including sea use of the hose 6.

Figure 7:
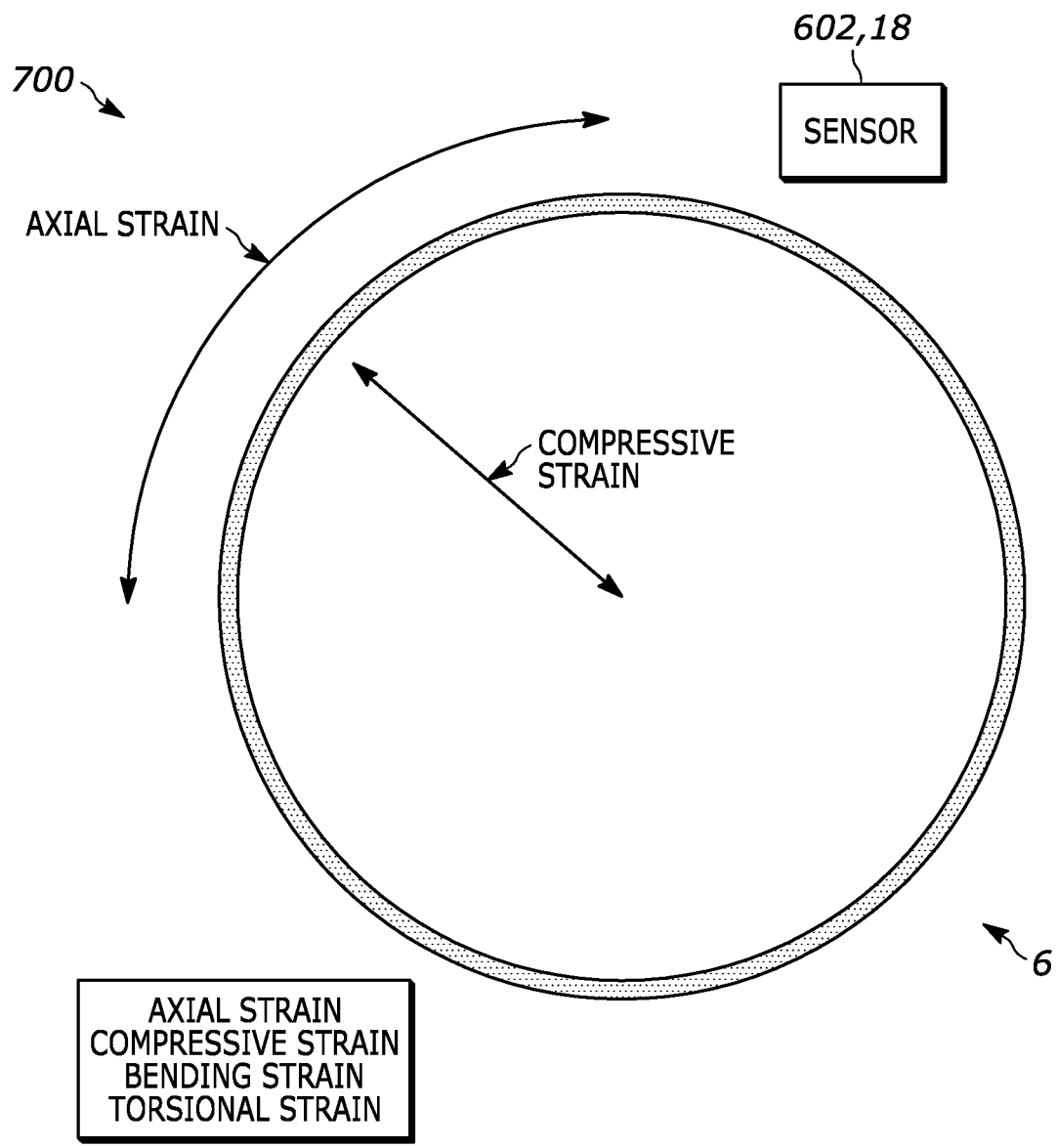
FIG. 7 is a diagram illustrating a cross section 700 of a hose 6 in accordance with one or more embodiments.

FIG. 7 is a diagram illustrating a cross section 700 of a hose 6 in accordance with one or more embodiments.

The diagram depicts an example of axial strain and compressive strain. The axial strain occurs about the circumference of the hose 6. The compressive strain goes toward or away from the center of the hose 6.

Figure 8:
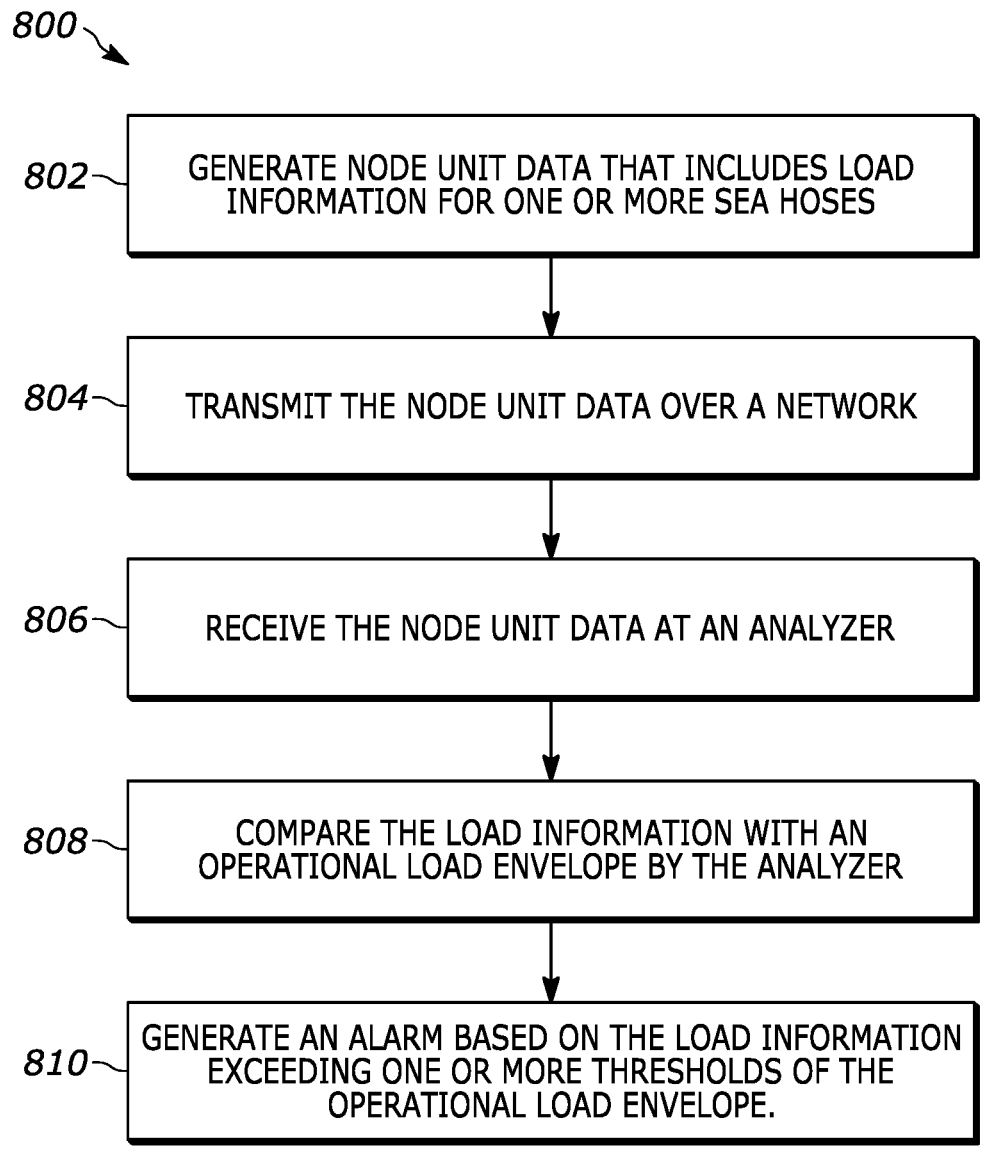
FIG. 8 is a flow diagram illustrating a method 800 for load monitoring of a sea hose in accordance with one or more systems.

FIG. 8 is a flow diagram illustrating a method 800 for load monitoring of a sea hose in accordance with one or more systems. The method 800 can be performed using the systems described above, such as system 2, system 100, 500 and variations thereof. Further, it is appreciated that the method 800 can include additional blocks or steps and omit recited steps in suitable variations of the method 800.

A plurality of node units generate node unit data that includes load information for one or more sea hoses at 802. The node units include sensors or load sensors as shown above. The sea hoses include subsea hoses and floating hoses for fluid transfer. The node unit data is generated at the plurality of node units and at least a portion of the node unit data can be transferred among at least some of the plurality of node units.

A gateway or similar device is configured to transmit the node unit data on or over a network at 804. The gateway or similar device collects the node unit data from the plurality of node units. The gateway or similar device can include a transceiver to send or receive information over the network to/from an analyser. The network can be a wireless network and/or other suitable network.

The analyzer receives the node unit data at 806. The analyzer can includes a transceiver and/or the like to receive the node unit data from the network.

The analyser can optionally be configured to generate or determine an operational load envelope for the one or more sea hoses over a period of time.

The analyser compares the load information with the operational load envelope at 808. The comparison can identify loads/strains that exceed permitted or standard values or thresholds.

The analyser generates an alarm at 810 based on the load information exceeding one or more thresholds of the operational load envelope.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). The techniques can also be used with new radio (NR) 5G, also from the 3GPP organization. Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a sea hose load analyzer system. The sea hose load analyzer system also includes a transceiver interface. The sea hose load analyzer system also includes a memory storage. The sea hose load analyzer system also includes circuitry may include one or more processors configured to: receive load information of one or more sea hoses as node unit data via the transceiver interface, store the load information in the memory storage, and monitor additional node unit data via the transceiver interface.

Implementations may include one or more of the following features. The system where the load information may include axial strain. The load information may include compressive strain. The circuitry is further configured to generate an operational load envelope for the one or more sea hoses based on the received node data. The circuitry is further configured to compare additional load information for the one or more seas hoses with the operational load envelope, where the one or more sea hoses include a floating hose and/or a subsea hose. The circuitry is further configured to trigger an alarm based on the load information. The circuitry is configured to determine that a hose repair is needed based on only the load information and without a visual inspection. The circuitry is further configured to determine what location of a hose needs the hose repair. The one or more sea hoses include a floating hose and a subsea hose. The one or more processors are further configured to analyze stored load information over a period of time to determine fatigue loading of the one or more sea hoses. The one or more processors are further configured to determine a remaining lifetime for the one or more sea hoses based on the fatigue loading and the stored load information over a period of time. The period of time is a month. The analyzer is configured to determine a remaining lifetime of the one or more seas hoses based on the load information over a period of time. Implementations of the described techniques may include hardware, a method or process, or computer software on a computer-accessible medium.

One general aspect includes a fluid transfer system. The fluid transfer system also includes a plurality of node units attached to one or more sea hoses and configured to generate node unit data may include load information on the one or more sea hoses. The fluid transfer system also includes a gateway configured transmit the node unit data to a network. The fluid transfer system also includes an analyzer configured to receive the node unit data from the network and to generate an operation movement envelope for the plurality of buoys.

Implementations may include one or more of the following features. The system where the analyzer is configured to monitor the node unit data after generating the operation load envelope. The plurality of node units may include strain sensors configured to measure one or more of axial strain, compressive strain and bending strain. The analyzer is configured to store the load information and determine fatiguing of the one or more sea hoses based on the stored load information over a period of time. Implementations of the described techniques may include hardware, a method or process, or computer software on a computer-accessible medium.

One general aspect includes a method of analyzing load information. The method of analyzing load information also includes generating node unit data that includes load information for one or more sea hoses having one or more floating hoses and subsea hoses. The method of analyzing load information also includes transmitting the node unit data over a network. The method of analyzing load information also includes receiving the node unit data at an analyzer. The method of analyzing load information also includes comparing the load information with an operational load envelope by the analyzer. The method of analyzing load information also includes generating an alarm based on the load information exceeding one or more thresholds of the operational load envelope.

Implementations may include one or more of the following features. The method where the node unit data includes temperature. The method may include determining a remaining lifetime of the one or more hoses based on the load information over a period of time. Implementations of the described techniques may include hardware, a method or process, or computer software on a computer-accessible medium.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

REFERENCE CHARACTER LIST (PART OF THE DESCRIPTION)

2 System
4 Buoy
6 Swim hose
8 Hose segment
10 Liquid inlet connection
11 Underwater hose
12 Liquid outlet connection
14 first end
16 Arrangement
18 Node unit
20 second end
22 first radio contact
24 second radio connection
26 third radio link
28 fourth radio link
30 Radio network
32 first relative distance
34 second relative distance
36 third relative distance
38 fourth relative distance
40 Main unit
42 first node device
44 second node device
46 third node unit
48 fourth node unit
50 Radio transmitter unit
52 Base station
54 Radio receiver
56 Unit of account
58 Connection flange
60 Sheath wall
62 Rubber material

What is claimed is:
1. A sea hose load analyzer system, the system comprising:
   a transceiver interface;
   a memory storage;
   circuitry comprising one or more processors configured to:
      receive load information of one or more sea hoses as node unit data via the transceiver interface;
      receive strain measurements for a plurality of sea hose nodes;
      determine hose pressure based on the strain measurements;
      receive location information for the plurality of sea hose nodes;
      store the load information in the memory storage;
      monitor additional node unit data via the transceiver interface; and
      compare the hose pressure and the strain measurements with allowable tolerances.

2. The system of claim 1, wherein the strain measurements comprise axial strain.

3. The system of claim 1, wherein the strain measurements comprise compressive strain.

4. The system of claim 1, wherein the circuitry is further configured to generate an operational load envelope for the one or more sea hoses based on the received node data.

5. The system of claim 4, wherein the circuitry is further configured to compare additional load information for the one or more seas hoses with the operational load envelope, where the one or more sea hoses include a floating hose and/or a subsea hose.

6. The system of claim 1, wherein the circuitry is further configured to trigger an alarm based on the load information.

7. The system of claim 1, wherein the circuitry is configured to determine that a hose repair is needed based on only the load information and without a visual inspection.

8. The system of claim 7, wherein the circuitry is further configured to determine what location of a hose needs the hose repair.

9. The system of claim 1, wherein the one or more sea hoses include a floating hose and a subsea hose.

10. The system of claim 1, wherein the one or more processors are further configured to analyze stored load information over a period of time to determine fatigue loading of the one or more sea hoses.

11. The system of claim 10, wherein the one or more processors are further configured to determine a remaining lifetime for the one or more sea hoses based on the fatigue loading and the stored load information over a period of time.

12. The system of claim 11, wherein the period of time is a month.

13. The system of claim 1, wherein the analyzer is configured to determine a remaining lifetime of the one or more seas hoses based on the load information over a period of time.

14. A method of analyzing load information, the method comprising:
    generating node unit data that includes load information for one or more sea hoses, the node unit data comprising strain measurements, locations measurements, and hose pressure;
    determining hose movement based on the node unit data;
    having one or more floating hoses and subsea hoses;
    transmitting the node unit data over a network;
    receiving the node unit data at an analyzer;
    comparing the load information with an operational load envelope by the analyzer; and
    generating an alarm based on the load information exceeding one or more thresholds of the operational load envelope.

15. The method of claim 14, wherein the node unit data includes temperature.

16. The method of claim 14, further comprising determining a remaining lifetime of the one or more hoses based on the load information over a period of time.

\* \* \* \* \*